Patented Sept. 5, 1922.

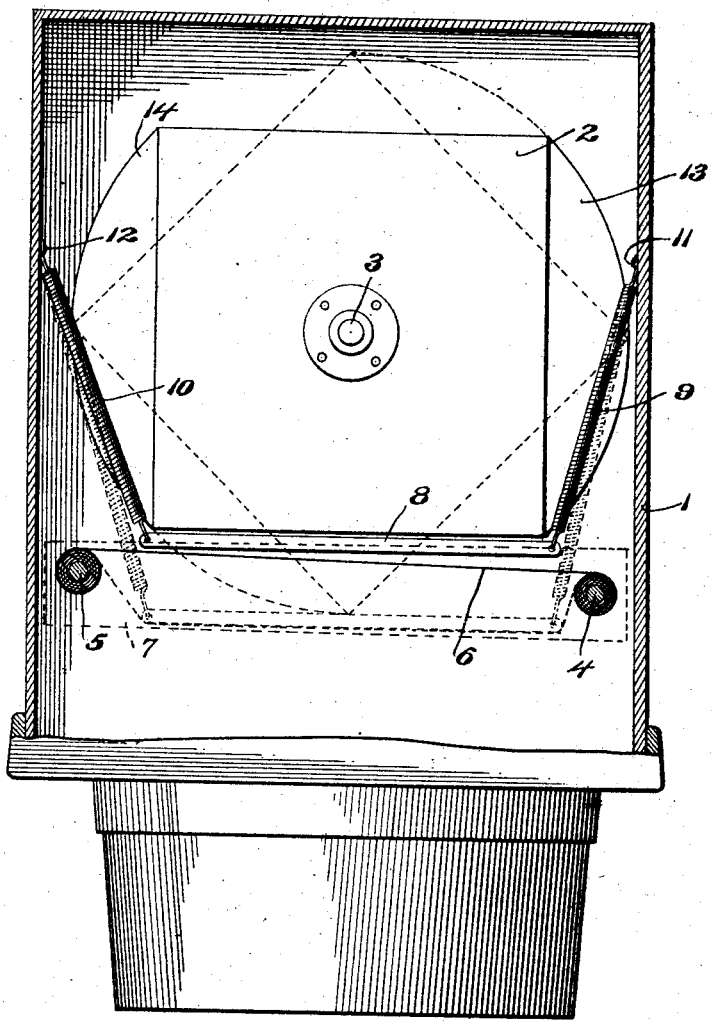

1,427,824

UNITED STATES PATENT OFFICE.

EDWIN F. KINGSBURY, OF RUTHERFORD, NEW JERSEY.

FOCAL-PLANE-SHUTTER-CURTAIN-DEPRESSING MECHANISM.

Application filed December 6, 1919. Serial No. 342,874.

*To all whom it may concern:*

Be it known that I, EDWIN F. KINGSBURY, a citizen of the United States, residing at Rutherford, in the county of Bergen and State of New Jersey, have invented certain new and useful Improvements in Focal-Plane - Shutter - Curtain - Depressing Mechanism, of which the following is a specification.

The present invention relates to cameras of the focal plane shutter type and consists in the combinations and arrangements of elements hereinafter described and particularly set forth in the accompanying claims.

The purpose of the invention is to provide means for depressing the focal plane shutter curtain alone instead of depressing the entire shutter frame and curtain when the revoluble magazine is turned, and thereby avoid the requirement of floating bearings for the depressible frame of the focal plane shutter which is a characteristic disadvantage in the structure and use of cameras of this type now employed.

The invention has for its further purpose to provide the necessary means for attaining these advantages which is of very simple construction, inexpensive to produce, and which will in no way operate to hinder the normal working of the camera.

The device is shown by way of illustration in the accompanying drawing wherein the figure is a central sectional view through the camera casing, showing the apparatus in applied position.

Referring to the construction in further detail the character 1 designates the casing of the camera of the focal plane shutter type of camera. The character 2 indicates a revoluble plate holder or magazine journaled in the casing 1 on the bearing 3; and 4 and 5 designate respectively the rolls of the focal plane shutter curtain 6 of the type used which have the usual actuating mechanism (not disclosed).

The rolls 4 and 5 of the shutter curtain 6 are of the usual spring tension kind and are suitably journaled within the frame 7, and said frame is in turn rigidly secured to the inner side walls of the casing 1 as shown. Said rolls 4 and 5 are spaced apart a distance which permits the shutter curtain to be depressed clear of said rolls.

The device per se consists of a depressible frame 8 interposed between the revoluble plate magazine 2 and the shutter curtain 6, as shown, and the said frame 8 is supported in resilient suspension by the springs 9 and 10 that are located on either side of the plate magazine 2 and fixedly secured to the inner sides of the casing walls 1, as indicated at 11 and 12.

The two side portions of the revoluble plate holder 2 are constructed with curved portions 13 and 14 concentric with the axis 3 and operable to engage with and depress the frame 8 and shutter curtain 6 in contact therewith, when said magazine is rotated for removing an exposed plate and positioning the next plate for exposure.

It will therefore be seen from the foregoing that, by having the shutter curtain rolls 4 and 5 relatively wide apart, the depressible frame 8 will move the focal plane shutter on the turning of magazine 2 without moving the rolls 4 and 5 and thus avoid using the floating bearings heretofore employed.

It will be understood, of course, that, while the invention as disclosed herein is of a specially designed construction, the invention is not limited to such structure but may on the other hand depart therefrom and employ such mechanism as may be deemed of advantage to use, within the scope of the claims.

What I claim as new is:

1. In combination with a camera having a revoluble magazine, a flexible focal plane shutter curtain, means for depressing said curtain when the magazine is revolved, and means for restoring said curtain to its normal position after it has been depressed.

2. In combination with a camera having a revoluble magazine, a flexible focal plane shutter curtain, a movable frame for depressing said curtain when the magazine is revolved, and means for restoring said curtain to its normal position after it has been depressed.

3. In combination with a camera having a revoluble magazine, a flexible focal plane shutter curtain, a resiliently sustained movable frame for depressing said curtain when the magazine is revolved, and means for restoring said curtain to its normal position after it has been depressed.

4. In combination with a camera having a revoluble magazine, a flexible focal plane shutter embodying a flexible curtain and curtain rollers adapted to hold the curtain stretched under tension while permitting the same to be depressed, and means for depressing said curtain when the magazine is revolved, the curtain stretching means serving to restore the curtain to its normal position after it has been depressed.

5. In combination with a camera having a revoluble magazine, a flexible focal plane shutter curtain, a fixed supporting frame for said curtain, means operable by the revoluble magazine for depressing said curtain when the magazine is revolved, and means for restoring said curtain to its normal position after it has been depressed.

6. In combination with a camera having a revoluble magazine, a flexible focal plane shutter curtain, a fixed supporting frame for said curtain, means on the magazine for depressing said curtain when the magazine is revolved, and means for restoring said curtain to its normal position after it has been depressed.

7. In combination with a camera having a revoluble magazine, a flexible focal plane shutter curtain, a fixed supporting frame for said curtain, a curtain depressing member operable by the magazine to depress the curtain when the magazine is revolved, and means for restoring the curtain to its normal position after it has been depressed.

8. In combination with a camera having a revoluble magazine, a flexible focal plane shutter curtain, a curtain depressing member operable by the magazine to depress the curtain independently of its supporting means when the magazine is revolved, yieldable sustaining means for said curtain depressing member, and means for restoring said curtain to its normal position after it has been depressed.

In testimony whereof I affix my signature.

EDWIN F. KINGSBURY.